US 8,294,312 B2

(12) United States Patent
Song et al.

(10) Patent No.: US 8,294,312 B2
(45) Date of Patent: Oct. 23, 2012

(54) BEARING AND SPINDLE MOTOR

(75) Inventors: Chung Hyun Song, Gwangsa-gu (KR); Tae Wook Lee, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/067,476

(22) PCT Filed: Aug. 21, 2007

(86) PCT No.: PCT/KR2007/003991
§ 371 (c)(1),
(2), (4) Date: Mar. 20, 2008

(87) PCT Pub. No.: WO2008/140154
PCT Pub. Date: Nov. 20, 2008

(65) Prior Publication Data
US 2010/0264767 A1  Oct. 21, 2010

(30) Foreign Application Priority Data

May 9, 2007  (KR) .................. 10-2007-0044968
Jun. 22, 2007  (KR) .................. 10-2007-0061378

(51) Int. Cl.
*F16C 17/10*  (2006.01)

(52) U.S. Cl. .......................... 310/90; 384/279

(58) Field of Classification Search ............ 310/90; 384/279, 902
See application file for complete search history.

(56) References Cited

U.S. PATENT DOCUMENTS

| | | | | |
|---|---|---|---|---|
| 3,445,148 A | * | 5/1969 | Grad et al. | ............... 384/279 |
| 6,270,259 B1 | * | 8/2001 | Burton | ............... 384/213 |
| 2002/0018315 A1 | * | 2/2002 | Nii et al. | ............... 360/99.08 |
| 2004/0013328 A1 | * | 1/2004 | Yoshimura et al. | ............... 384/100 |
| 2004/0211290 A1 | | 10/2004 | Shimizu et al. | |
| 2006/0171615 A1 | * | 8/2006 | Kodama | ............... 384/100 |

FOREIGN PATENT DOCUMENTS

| | | |
|---|---|---|
| JP | 09-068225 A | 3/1997 |
| JP | 09-210067 A | 8/1997 |
| JP | 10210700 A * | 8/1998 |
| JP | 11172305 A * | 6/1999 |
| JP | 2004-270013 A | 9/2004 |
| JP | 2006-153056 A | 6/2006 |
| KR | 10-2002-0050063 | 6/2002 |
| KR | 10-2003-0090560 | 11/2003 |
| KR | 10-2006-0023625 | 3/2006 |
| KR | 10-2006-0086612 | 8/2006 |
| WO | WO-2005/124171 A1 | 12/2005 |

OTHER PUBLICATIONS

Machine Translation of JP0210700 Feb. 2, 2011.*
Translation of JP 11172305 Apr. 2011.*
Office Action dated Jul. 10, 2012 in Japanese Application No. 2010-507308, filed Aug. 21, 2007.

* cited by examiner

*Primary Examiner* — Quyen Leung
*Assistant Examiner* — David Scheuermann
(74) *Attorney, Agent, or Firm* — Saliwanchik, Lloyd & Eisenschenk

(57) ABSTRACT

Provided is a sintered bearing with oil for a spindle motor. The bearing is characterized in that at least one portion of upper and lower sides of the bearing is denser than other portions of the bearing.

15 Claims, 4 Drawing Sheets

[Fig. 1] Prior Art
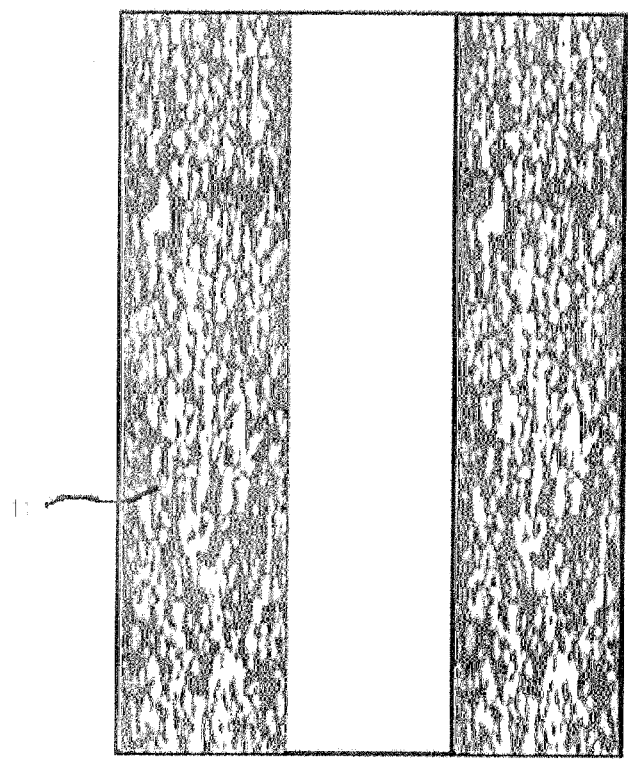
[Fig. 2] Prior Art
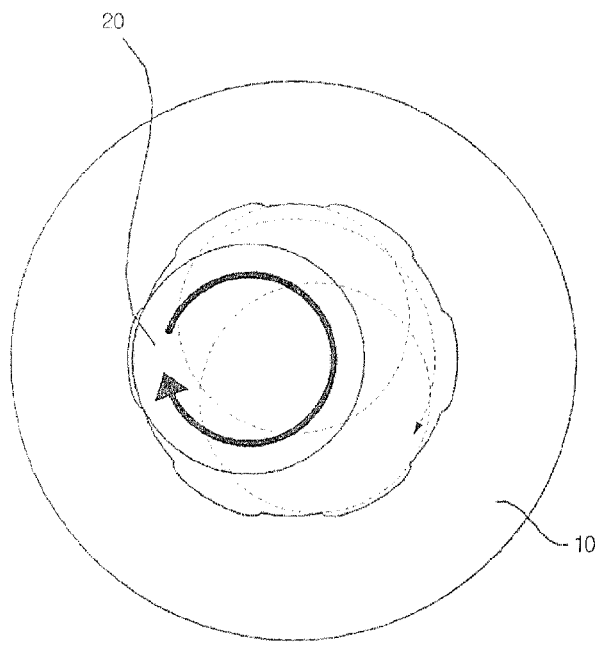

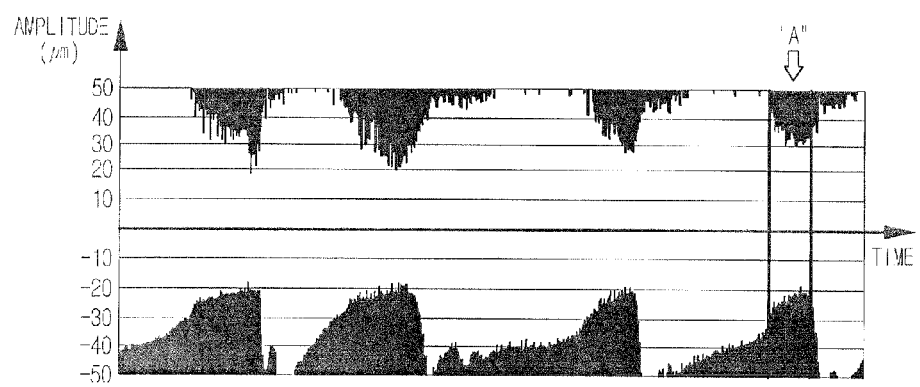
[Fig. 3] Prior Art
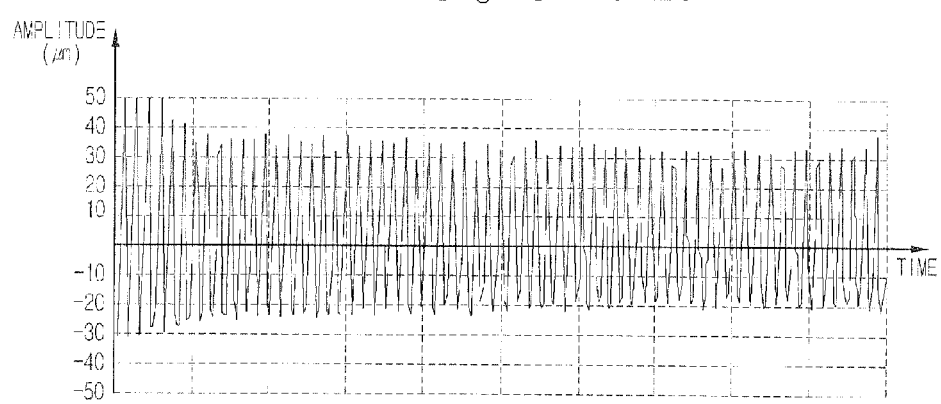
[Fig. 4] Prior Art
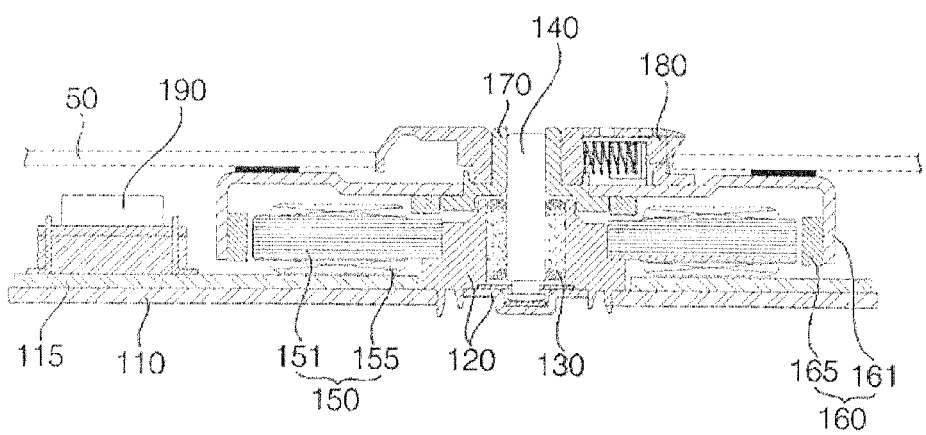
[Fig. 5]

[Fig. 6]
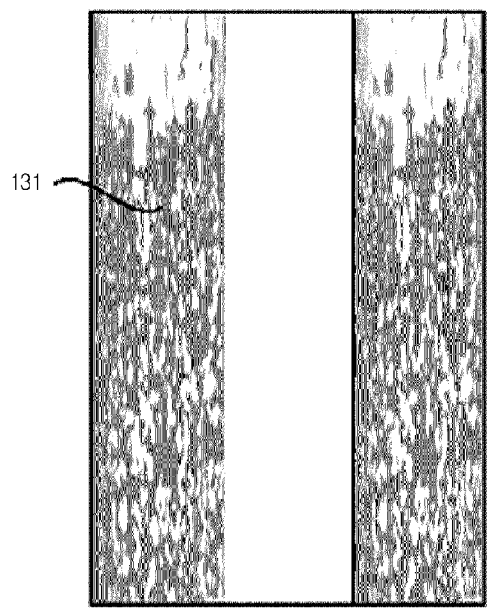
[Fig. 7]
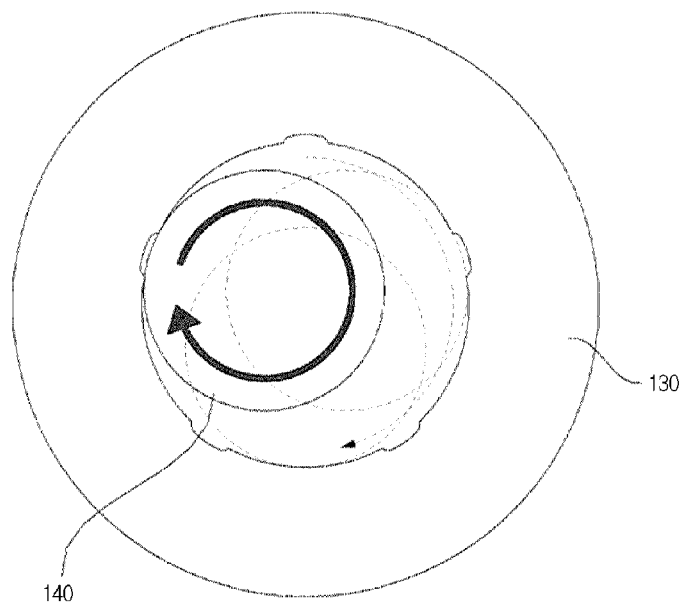
[Fig. 8]
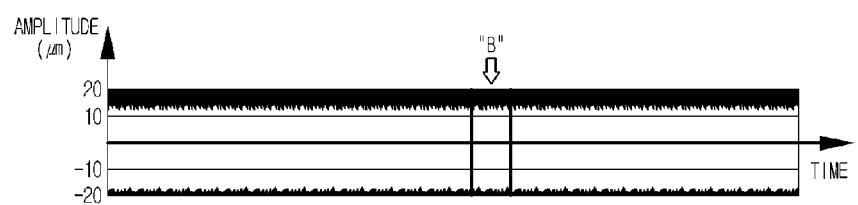

[Fig. 9]
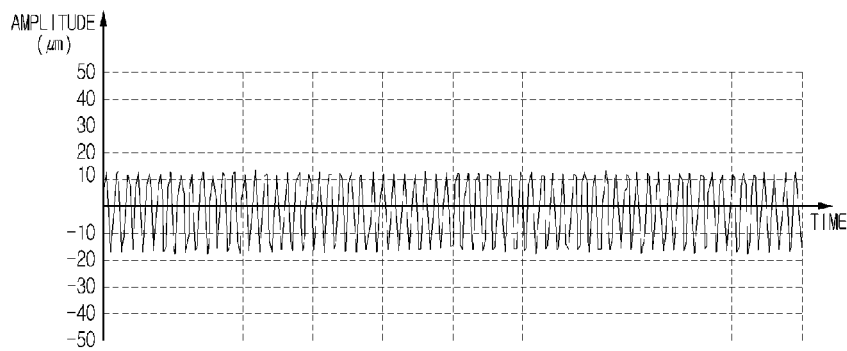
[Fig. 10]
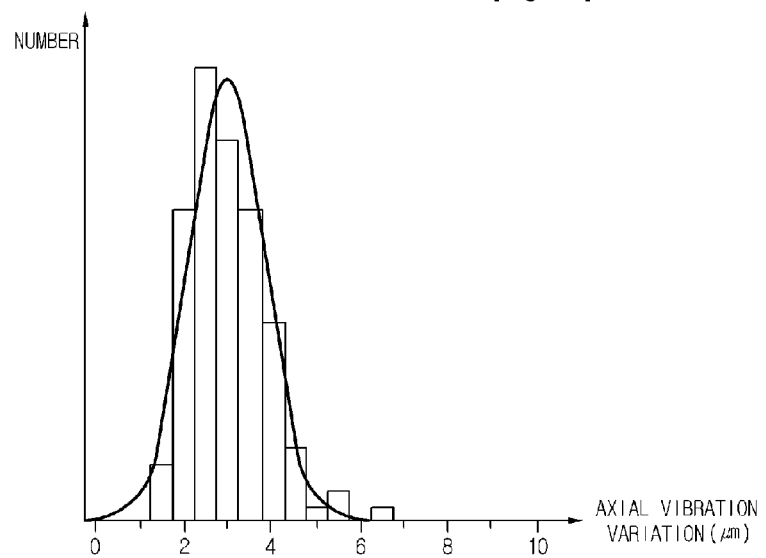
[Fig. 11]
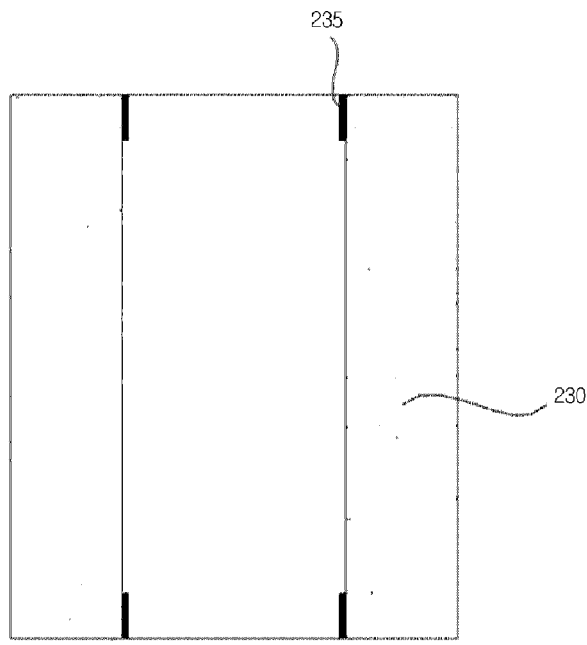

BEARING AND SPINDLE MOTOR

CROSS-REFERENCE TO RELATED APPLICATION

This application is the U.S. national stage application of International Patent Application No. PCT/KR2007/003991, filed Aug. 21, 2007, the disclosure of which is hereby incorporated by reference in its entirety.

TECHNICAL FIELD

Embodiments relate to a bearing and a spindle motor including the bearing. BACKGROUND ART A spindle motor is used in an optical disk drive (ODD) for rotating a disk to read data from the disk while moving an optical pickup in a radial direction of the disk. In the optical disk drive, the disk is loaded on a turntable fixed to a shaft. Thus, the disk can be rotated by driving the turntable. The shaft is supported by a bearing that is tightly fitted into a bearing housing.

FIG. 1 is a sectional view illustrating pores of a bearing 10 according to the related art, and FIG. 2 is a plan view illustrating the bearing 10 and a shaft 20 coupled with the bearing 10.

Referring to FIG. 1, the bearing 10 is formed by sinter metal powder. When a sectional image of the bearing 10 is taken using a scanning electron microscope after cutting the bearing 10 in a longitudinal direction, pores 11 can be found in the bearing 10 and on the cut surface thereof. Owing to the pores 11, the bearing 10 can contain 10% by volume of oil or more. In FIG. 1, white regions are metal, and dark regions are pores 11.

Referring to FIG. 2, in a spindle motor (not shown), the bearing 10 is tightly fitted in a bearing housing (not shown) for supporting a shaft 20 that is rotatably inserted in the bearing 10.

The shaft 20 is fixed to a rotor (not shown) that can rotate by reaction with a stator (not shown). When the shaft 20 fixed to the rotor rotates in the bearing 10, owing to a gap between the shaft 20 and the bearing 10, the shaft 20 rotates around its axis as indicated by the solid arrow and at the same time rotates around the axis of the bearing 10 as indicated by the dashed-line arrow.

The inner surface of the bearing 10, which makes contact with the outer surface of the shaft 10, is uneven because of the pores 11. Therefore, the spindle motor including the bearing 10 is disadvantageous in that when the shaft 20 rotates in the bearing 10, the shaft 20 vibrates in a radial direction because of the inner surface of the bearing 10 is uneven due to the pores 11. As a result, a disk may vibrate axially when the disk is rotated by the spindle motor including the bearing 10. This will now be described in detail with reference to FIGS. 3 and 4.

FIG. 3 is a graph illustrating axial vibration of a disk rotated by a spindle motor including a bearing according to the related art, and FIG. 4 is an enlarged view of portion A of FIG. 3.

The graph of FIG. 3 is obtained by rotating a disk (not shown) having a radius of 60 mm at 40 rpm and measuring the axial vibration of the disk at a point spaced about 57 mm to 58 mm from the center of the disk using a laser detector.

Referring to FIG. 3, at the measurement point, the positive (upward) peak amplitude of the axial vibration of the disk varies in the range from about 18 μm to more than 50 μm, and the negative (downward) peak amplitude of the axial vibration of the disk varies in the range from about −18 μm to less than −50 μm. Therefore, the widths of the positive and negative peak amplitude variations are 32 μm or more, respectively.

Referring to portion A of FIG. 3 enlarged in FIG. 4, at the measurement point, the positive peak amplitude of the axial vibration of the disk varies in the range from about 28 μm to about 50 μm, and the negative peak amplitude of the axial vibration of the disk varies in the range from about −18 μm to about −32 μm. Therefore, the widths of the positive and negative peak amplitude variations are 22 μm and 14 μm, respectively.

In the spindle motor including the bearing 10, the radial vibration of the shaft 20 is substantial. Thus, the axial vibration of the disk rotated by the spindle motor is also substantial. As a result, an optical pickup using the spindle motor cannot be reliable.

Particularly, when the peak amplitude of the axial vibration of the disk rotated at a low speed is varied by 10 μm or more, it is difficult to print a desired pattern on the disk using a laser while rotating the disk due to unexpected superposition and omission of lines of the pattern caused by the axial vibration of the disk.

DISCLOSURE OF INVENTION

Technical Problem

Embodiments provide a bearing and a spindle motor including the bearing.

Embodiments also provide a bearing that can reduce axial vibration of a disk, and a spindle motor including the bearing.

Embodiments also provide a bearing configured for precisely printing a desired pattern on a surface of a disk, and a spindle motor including the bearing.

Technical Solution

An embodiment provides a sintered bearing impregnated with oil for a spindle motor, wherein at least one portion of upper and lower sides of the bearing is denser than other portions of the bearing.

An embodiment provides a spindle motor comprising: a bearing housing; a sintered bearing impregnated with oil and arranged in the bearing housing, the bearing including lots of pores for oil; a shaft in the bearing, the shaft being rotatably supported by the bearing; a stator around the bearing housing; and a rotor fixed to the shaft and rotatable by reaction with the stator, wherein at least one portion of upper and lower sides of the bearing is denser than other portions of the bearing.

An embodiment provides a spindle motor comprising: a bearing housing; a sintered bearing impregnated with oil and arranged in the bearing housing, the bearing including lots of pores for oil; a shaft in the bearing, the shaft being rotatably supported by the bearing; a stator around the bearing housing; and a rotor fixed to the shaft and rotatable by reaction with the stator, wherein at least one portion of upper and lower sides of the bearing is coated.

Advantageous Effects

Embodiments can provide a bearing and a spindle motor including the bearing.

Embodiments can provide a bearing that can reduce axial vibration of a disk, and a spindle motor including the bearing.

Embodiments can provide a bearing configured for precisely printing a desired pattern on a surface of a disk, and a spindle motor including the bearing.

BRIEF DESCRIPTION OF THE DRAWINGS

FIG. 1 is a view illustrating pores of a bearing of the related art.

FIG. 2 is a plan view illustrating the bearing of FIG. 1 and a shaft coupled with the bearing.

FIG. 3 is a graph illustrating axial vibration of a disk rotated by a spindle motor including a bearing according to the related art FIG. 4 is an enlarged view of portion A of FIG. 3.

FIG. 5 is a sectional view illustrating a spindle motor according to an embodiment.

FIG. 6 is a view illustrating pores of a bearing according to an embodiment.

FIG. 7 is a plan view illustrating the bearing of FIG. 6 and a shaft coupled with the bearing according to an embodiment.

FIG. 8 is a graph illustrating axial vibration of a disk rotated by a spindle motor including a bearing according to an embodiment.

FIG. 9 is an enlarged view of portion B of FIG. 8.

FIG. 10 is a graph illustrating the results of a disk axial vibration test performed using a plurality of spindle motors including bearings according to an embodiment.

FIG. 11 is a sectional view illustrating a bearing according to another embodiment.

MODE FOR THE INVENTION

Reference will now be made in detail to the embodiments of the present disclosure, examples of which are illustrated in the accompanying drawings.

FIG. 5 is a sectional view illustrating a spindle motor according to an embodiment.

Referring to FIG. 5, a bearing housing 120 is mounted on a base 110. A bearing 130 is tightly fitted in the bearing housing 120 for supporting a lower portion of a rotatable shaft 140. The bearing 130 is formed of metal powder by sintering. Thus, the bearing 130 can include pores 131 (refer to FIG. 6) in its surface and inner body for containing oil.

A stator 150 is fixed to the bearing housing 120, and a rotator 160 is fixed to the shaft 140. The stator 150 includes a core 151 and a coil 155. The core 151 is fixed to an outer surface of the bearing housing 120, and the coil 155 is wound around the core 151. The rotator 160 includes a rotor yoke 161 and magnets 165. The rotor yoke 161 is fixed to a bush 170, and the bush 170 is fixed to an outer surface of the shaft 140 protruded from the bearing housing 120. The magnets 165 are fixed to an inner surface of the rotor yoke 161.

When a current is applied to the coil 155, the rotator 160 and the shaft 140 rotates together by an electromagnetic force acting between the coil 155 and the magnets 165. A disk 50 is loaded on the rotor yoke 161.

Reference numeral 115 denotes a substrate, and reference numeral 180 denotes a clamp that elastically supports the disk 50 loaded on the rotor yoke 161 for aligning the center of the disk 50 with the center of the shaft 140. Reference numeral 190 denotes an encoder for reading data recoded on the disk 50 when printing a pattern on the disk 50.

The shaft 140 can rotate smoothly in the bearing 130 owing to a gap between the shaft 140 and the bearing 130. However, referring to FIG. 7, because of the gap between the shaft 140 and the bearing 130, the shaft 140 in the bearing 130 rotates around its axis as indicated by the solid arrow and along the inner surface of the bearing 130 (around the axis of the bearing 130) as indicated by the dashed-line arrow.

The spindle motor of the current embodiment is designed to reduce radial vibration of the shaft 140 caused by the rotation of the shaft 140 along the inner surface of the bearing 130. This will now be described in detail with reference to FIGS. 6 and 7.

FIG. 6 is a view illustrating pores 131 of the bearing 130 according to an embodiment, and FIG. 7 is a plan view illustrating how the bearing 130 and the shaft 140 are coupled with each other according to an embodiment.

Referring to FIG. 6, the bearing 130 of the current embodiment is formed of metal powder by sintering. When a sectional image of the bearing 130 is taken using a scanning electron microscope after cutting the bearing 130 in a longitudinal direction, the pores 131 can be found in the bearing 130 and on the cut surface thereof. Owing to the pores 131, the bearing 130 can contain oil. In the image of FIG. 6, white regions are metal, and dark regions are pores 131.

When the shaft 140 rotates, the outer surface of the shaft 140 mainly makes contact with upper and lower portions of the inner surface of the bearing 130. Specifically, the outer surface of the shaft 140 mainly makes contact with upper and lower edge portions of the bearing 130.

Therefore, the bearing 130 of the current embodiment is designed in a manner such that at least one of the upper and lower portions of the bearing 130 that mainly make contact with the shaft 140 has a density higher than that of the other portion of the bearing 130. In this case, the number or size of the pores 131 can be relatively small at the dense portion of the bearing 130, thereby reducing the radial vibration of the shaft 140 caused by the rotation of the shaft 140 along the upper and lower portions of the inner surface of the bearing 130.

For example, the dense portion of the bearing 130 may contain 10% or less by volume of oil, and the other portion of the bearing 130 may contain 18% or more by volume of oil. Thus, the radial vibration of the shaft 140 can be reduced without affecting the lifespan of the bearing 130. Alternatively, only the upper and lower edge portions of the bearing 130, which substantially make contact with the outer surface of the shaft 140, can have a density higher than that of the other portion of the shaft 140.

Alternatively, at least one region of at least one of the upper and lower portions of the inner surface of the bearing 130 can have a density higher than that of at least one region of a middle portion of the inner surface of the bearing 130. In this case, the dense region of the bearing 130 may contain 10% or less by volume of oil.

For example, in the third case, the dense region of the bearing 130 may contain 10% or less by volume of oil, and the low-dense region of the middle portion of the inner surface of the bearing 130 may contain about 18% to 30% by volume of oil.

Referring to an image of FIG. 6, the bearing 130 of the embodiment has an upper dense portion.

Results of a disk axial vibration test performed using the spindle motor including the bearing 130 will now be described with reference to FIGS. 5, 8, and 9.

FIG. 8 is a graph illustrating axial vibration of a disk rotated by the spindle motor including the bearing 130 according to an embodiment, and FIG. 9 is an enlarged view of portion B of FIG. 3.

The graph of FIG. 8 is obtained by rotating the disk 50 having a radius of 60 mm at 40 rpm using the spindle motor including the bearing 130 of which upper portion is dense, and measuring axial vibration of the disk 50 at a point spaced about 57 mm to 58 mm from the center of the disk 50 using a laser detector.

Referring to FIGS. 8 and 9, at the measurement point, the positive (upward) peak amplitude of the axial vibration of the disk 50 varies in the range from about 12 μm to about 14 μm, and the negative (downward) peak amplitude of the axial vibration of the disk 50 varies in the range from about −15 μm to about −18 μm. Therefore, the widths of the positive peak amplitude variation and the negative peak amplitude variation are only 2 μm and 3 μm, respectively.

FIG. 10 is a graph illustrating the results of a disk axial vibration test performed using a plurality of spindle motors including bearings according to an embodiment.

To obtain the graph shown in FIG. 10, the widths of the positive or negative peak amplitude variations of axial vibrations of one hundred thirty disks 50 were measured by the same method as that explained in FIGS. 8 and 9 while respectively rotating the one hundred thirty disks 50 using one hundred thirty spindle motors each including a sample of the bearing 130.

Referring to FIG. 10, most of the widths of the positive or negative peak amplitude variations of the one hundred thirty disks were in the range from 2 μm to 4 μm. Even the maximum is not greater than 10 μm.

As described in FIGS. 8 through 10, when the width of the peak amplitude variation of the axial vibration of the disk 50 is small, the radial vibration of the shaft 140 is also small. Therefore, it can be understood from the test results shown in FIG. 10 that the bearing 130 and the spindle motor using the bearing 130 are effective for reducing the radial vibration of the shaft 140.

When the lower portion of the bearing 130 has a high density, the same (or similar) results as those explained in FIGS. 8 to 10 were obtained. Furthermore, when both the upper and lower portions of the bearing 130 have a high density, the axial vibration of the disk 50 were further reduced as compared with the case explained in FIGS. 8 to 10.

FIG. 11 is a sectional view illustrating a bearing 230 according to another embodiment. Referring to FIG. 11, a coating 235 is formed on at least one of upper and lower portions of the inner surface of the bearing 230 that are in contact with the shaft 140 when the shaft 140 rotates. In detail, at least one of the upper and lower edge portions of the inner surface of the bearing 230 that substantially make contact with the shaft 140 when the shaft 140 rotates is coated so as to fill pores of the coated portion of the bearing 230. Therefore, the coated portion of the bearing 230 can be more smooth as compared with the other portion of the bearing 230 having pores.

Since the pores of at least one of the upper and lower portions of the inner surface of the bearing 230 are filled, the radial vibration of the shaft 140 can be reduced. Therefore, axial vibration of a disk can also be reduced when the disk rotates using the shaft 140.

As described in the embodiments, according to the bearing and the spindle motor including the bearing, the upper or lower portion of the inner surface of the bearing that substantially makes contact with the shaft when the shaft rotates is densely formed or coated. Therefore, the dense or coated portion of the bearing can be relatively smooth, and thus the radial vibration of the shaft can be reduced. Hence, the spindle motor can be used more reliably.

Furthermore, since the axial vibration of a disk rotated by the spindle motor can be reduced, a desired pattern can be precisely printed on the surface of the disk while rotating the disk using the spindle motor.

INDUSTRIAL APPLICABILITY

Embodiments can be applied to bearings and motors using the bearings.

The invention claimed is:

1. A sintered bearing impregnated with oil for a spindle motor, comprising:
    an inner circumference surface configured to form a hole through the bearing;
    an outer circumference surface opposite from the inner circumference surface in a radial direction;
    a top surface at an uppermost portion of the bearing in a vertical direction perpendicular to the radial direction; and
    a bottom surface at a lowermost portion of the bearing in the vertical direction,
    wherein the inner circumference surface consists of an inner circumferential upper surface, an inner circumferential lower surface, and an inner circumferential middle surface between the inner circumferential upper surface and the inner circumferential lower surface in the vertical direction,
    wherein at least one of the entire inner circumferential upper surface and the entire inner circumferential lower surface of the inner circumference surface of the bearing is denser than the entire inner circumferential middle surface;
    wherein the outer circumference surface consists of an outer circumferential upper surface, an outer circumferential lower surface, and an outer circumferential middle surface between the outer circumferential upper surface and the outer circumferential lower surface in the vertical direction,
    wherein at least one of the entire outer circumferential upper surface and the entire outer circumferential lower surface of the outer circumference surface of the bearing is denser than the entire outer circumferential middle surface.

2. The bearing according to claim 1, wherein at least one edge region of the upper and lower sides of the inner circumference surface of the bearing is denser than other portions of the inner circumference surface of the bearing.

3. The bearing according to claim 1, wherein a ratio of oil impregnated in the denser portion of the bearing is about 10 vol % or less.

4. The bearing according to claim 1, wherein the denser portion of the bearing contains oil less than other portions of the bearing.

5. The bearing according to claim 4, wherein a ratio of oil impregnated in the denser portion of the bearing is about 10 vol % or less, and other portions of the bearing is about 18 vol % to 30 vol %.

6. A spindle motor comprising:
    a bearing housing;
    a sintered bearing impregnated with oil and arranged in the bearing housing, the bearing including lots of pores for oil;
    a shaft in the bearing, the shaft being rotatably supported by the bearing;
    a stator around the bearing housing; and
    a rotor fixed to the shaft and rotatable by reaction with the stator,
    wherein the bearing comprises:
        an inner circumference surface configured to form a hole for rotatably supporting the shaft;
        an outer circumference surface opposite from the inner circumference surface in a radial direction;
        a top surface at an uppermost portion of the bearing in a vertical direction perpendicular to the radial direction; and a bottom surface at a lowermost portion of the bearing in the vertical direction, wherein the inner circumference surface consists of an inner circumferential upper surface, an inner circumferential lower surface, and an inner circumferential middle surface between the inner circumferential upper surface and the inner circumferential lower surface in the vertical direction, wherein at least one of the entire inner circumferential upper surface and the entire inner circumferential lower surface of the inner circumference surface of the bearing is denser than the entire inner circumferential middle surface;

wherein the outer circumference surface consists of an outer circumferential upper surface, an outer circumferential lower surface, and an outer circumferential middle surface between the outer circumferential upper surface and the outer circumferential lower surface in the vertical direction, wherein at least one of the entire outer circumferential upper surface and the entire outer circumferential lower surface of the outer circumference surface of the bearing is denser than the entire outer circumferential middle surface.

7. The spindle motor according to claim 6, wherein at least one edge region of the upper and lower sides of the inner circumference surface of the bearing is denser than other portions of the inner circumference surface of the bearing.

8. The spindle motor according to claim 6, wherein a ratio of oil impregnated in the denser portion of the bearing is about 10 vol % or less.

9. The spindle motor according to claim 6, wherein at least a portion of at least one of the upper and lower sides of the inner circumference surface of the bearing comprises 10% or less by volume of oil.

10. A spindle motor comprising:
a bearing housing;
a sintered bearing impregnated with oil and arranged in the bearing housing, the bearing including lots of pores for oil;
a shaft in the bearing, the shaft being rotatably supported by the bearing;
a stator around the bearing housing; and
a rotor fixed to the shaft and rotatable by reaction with the stator, wherein the bearing comprises:
an inner circumference surface configured to form a hole for rotatably supporting the shaft;
an outer circumference surface opposite from the inner circumference surface in a radial direction;
a top surface at an uppermost portion of the bearing in a vertical direction perpendicular to the radial direction; and a bottom surface at a lowermost portion of the bearing in the vertical direction, wherein the inner circumference surface is only partially coated, wherein a first portion of the inner circumference surface is coated, a second portion of the inner circumference is not coated, and a third portion of the inner circumference surface is coated, and wherein the second portion of the inner circumference surface is disposed between the first portion and the third portion of the inner circumference surface in the vertical direction.

11. The spindle motor according to claim 10, wherein at least one edge region of the upper and lower sides of the inner circumference surface of the bearing is coated.

12. The spindle motor according to claim 6, comprising an encoder at a side of the stator for reading data recorded on a surface of a disk.

13. The spindle motor according to claim 10, comprising an encoder at a side of the stator for reading data recorded on a surface of a disk.

14. The sintered bearing according to claim 1, wherein the entire circumferential upper surface of the inner circumference surface of the bearing is denser than other portions of the inner circumference surface of the bearing.

15. The spindle motor according to claim 6, wherein the entire circumferential upper surface of the inner circumference surface of the bearing is denser than other portions of the inner circumference surface of the bearing.

* * * * *